United States Patent
Qu et al.

(10) Patent No.: US 12,518,169 B2
(45) Date of Patent: Jan. 6, 2026

(54) SYSTEMS AND METHODS FOR SAMPLE GENERATION FOR IDENTIFYING MANUFACTURING DEFECTS

(71) Applicant: Samsung Display Co., Ltd., Yongin-si (KR)

(72) Inventors: Shuhui Qu, Fremont, CA (US); Janghwan Lee, Pleasanton, CA (US); Yan Kang, Sunnyvale, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 772 days.

(21) Appl. No.: 17/367,179

(22) Filed: Jul. 2, 2021

(65) Prior Publication Data
US 2022/0374720 A1 Nov. 24, 2022

Related U.S. Application Data

(60) Provisional application No. 63/190,172, filed on May 18, 2021.

(51) Int. Cl.
*G06N 3/088* (2023.01)
*G06F 18/21* (2023.01)
(Continued)

(52) U.S. Cl.
CPC ......... *G06N 3/088* (2013.01); *G06F 18/2113* (2023.01); *G06F 18/214* (2023.01);
(Continued)

(58) Field of Classification Search
CPC ........ G06N 3/088; G06N 3/063; G06N 20/00; G06N 3/045; G06F 18/2113;
(Continued)

(56) References Cited

U.S. PATENT DOCUMENTS

| 9,760,807 B2 | 9/2017 | Zhou et al. |
| 9,767,565 B2 | 9/2017 | Estrada et al. |

(Continued)

FOREIGN PATENT DOCUMENTS

CN 109583489 A 4/2019

OTHER PUBLICATIONS

Niu et al, "Defect Image Sample Generation With GAN for Improving Defect Recognition", 2020, IEEE Transactions on Automation Science and Engineering, vol. 17, No. 3, pp. 1611-1622. (Year: 2020).*

(Continued)

*Primary Examiner* — Alexey Shmatov
*Assistant Examiner* — Clint Mullinax
(74) *Attorney, Agent, or Firm* — Womble Bond Dickinson (US) LLP

(57) ABSTRACT

Systems and methods for classifying products are disclosed. A first data sample having a first portion and a second portion is identified from a training dataset. A first mask is generated based on the first data sample, where the first mask is associated with the first portion of the first data sample. A second data sample is generated based on a noise input. The first mask is applied to the second data sample for outputting a third portion of the second data sample. The third portion of the second data sample is combined with the second portion of the first data sample for generating a first combined data sample. Confidence and classification of the first combined data sample are predicted. The first combined data sample is added to the training dataset in response to predicting the confidence and the classification.

18 Claims, 6 Drawing Sheets

(51) Int. Cl.
  *G06F 18/2113* (2023.01)
  *G06F 18/214* (2023.01)
  *G06N 3/063* (2023.01)
  *G06V 10/88* (2022.01)
(52) U.S. Cl.
  CPC .......... *G06F 18/217* (2023.01); *G06N 3/063* (2013.01); *G06V 10/898* (2022.01)
(58) Field of Classification Search
  CPC ... G06F 18/214; G06F 18/217; G06V 10/898; G06V 10/776; G06V 10/82; G06V 2201/06; G06V 10/774; G06V 10/764; G06T 2207/20084; G06T 2207/30121; G06T 7/0004; G06T 7/0008; G06T 2207/30108
  See application file for complete search history.

(56) References Cited

U.S. PATENT DOCUMENTS

| | | | |
|---|---|---|---|
| 10,181,185 B2 | 1/2019 | Park et al. | |
| 10,242,449 B2 | 3/2019 | Liston et al. | |
| 10,262,236 B2 | 4/2019 | Lim et al. | |
| 10,410,096 B2 | 9/2019 | Dijkman et al. | |
| 10,417,524 B2 | 9/2019 | Feng et al. | |
| 10,436,720 B2 | 10/2019 | He et al. | |
| 10,475,174 B2 | 11/2019 | Lim et al. | |
| 10,546,242 B2 | 1/2020 | Jain et al. | |
| 10,607,119 B2 | 3/2020 | He et al. | |
| 10,607,331 B1 | 3/2020 | Tandia et al. | |
| 10,643,320 B2 | 5/2020 | Lee et al. | |
| 10,769,766 B1 | 9/2020 | Padfield et al. | |
| 10,825,219 B2 | 11/2020 | Fu et al. | |
| 2018/0060701 A1* | 3/2018 | Krishnamurthy | G06N 3/045 |
| 2019/0295223 A1 | 9/2019 | Shen et al. | |
| 2019/0303717 A1 | 10/2019 | Bhaskar et al. | |
| 2020/0118423 A1* | 4/2020 | Moura | G06V 20/54 |
| 2020/0311615 A1 | 10/2020 | Jammalamadaka et al. | |
| 2020/0364842 A1 | 11/2020 | Chaton | |
| 2020/0387755 A1 | 12/2020 | Hagen et al. | |
| 2021/0035305 A1* | 2/2021 | Fang | G06V 10/25 |
| 2021/0089845 A1* | 3/2021 | Galeev | G06V 30/19147 |
| 2021/0358123 A1* | 11/2021 | Kearney | G16H 30/40 |
| 2022/0014723 A1* | 1/2022 | Pandey | G06T 7/174 |
| 2022/0083807 A1* | 3/2022 | Zhang | G06N 3/084 |
| 2022/0084204 A1* | 3/2022 | Li | G06N 3/08 |
| 2022/0093270 A1* | 3/2022 | Gheorghita | G06N 3/08 |
| 2022/0309292 A1* | 9/2022 | Albrecht | G06F 18/241 |
| 2023/0076868 A1* | 3/2023 | Olender | G06T 7/0012 |

OTHER PUBLICATIONS

EPO Extended European Search Report dated Jun. 22, 2022, issued in corresponding European Patent Application No. 22150491.3 (8 pages).

Jeong, Eui-Young et al., "A more reliable defect detection and performance improvement method for panel inspection based on artificial intelligence," Journal of Information Display, https://doi.org/10.1080/15980316.2021.1876174. 11 pages.

Kim, Wonjik et al., "Unsupervised Learning of Image Segmentation Based on Differentiable Feature Clustering," IEEE Transactions on Image Processing, arXiv:2007.09990v1 [cs.CV] Jul. 20, 2020, 14 pages.

Northcutt et al, "Confident Learning: Estimating Uncertainty in Dataset Labels," (2021) available at https://arxiv.org/abs/1911.00068v4, 42 pages.

Shi, Jianbo et al., "Normalized Cuts and Image Segmentation," IEEE Transactions on Pattern Analysis and Machine Intelligence, vol. 22, No. 8, Aug. 2000, pp. 888-905.

Tang, Meng et al., "Normalized Cut Loss for Weakly-supervised CNN Segmentation," arXiv:1804.01346v1 [cs.CV] Apr. 4, 2018, 10 pages.

Xia, Xide et al., "W-Net: A Deep Model for Fully Unsupervised Image Segmentation," arXiv:1711.08506v1 [cs.CV] Nov. 22, 2017, pp. 4321-4333.

* cited by examiner

SYSTEMS AND METHODS FOR SAMPLE GENERATION FOR IDENTIFYING MANUFACTURING DEFECTS

CROSS-REFERENCE TO RELATED APPLICATION(S)

The present application claims priority to and the benefit of U.S. Provisional Application No. 63/190,172, filed May 18, 2021, entitled "UNSUPERVISED OBJECT SEGMENTATION AND SAMPLE GENERATION FOR MANUFACTURING DISPLAY IMAGE BASED ON GENERATIVE ADVERSARIAL NETWORK," the entire content of which is incorporated herein by reference.

FIELD

One or more aspects of embodiments according to the present disclosure relate to classifiers, and more particularly to a system and method for enriching a training dataset with realistic data samples for training a classifier.

BACKGROUND

The mobile display industry has grown rapidly in recent years. As new types of display panel modules and production methods are being deployed, surface defects have been harder to inspect using just traditional mechanisms. It would be desirable to employ artificial intelligence (AI) to automatically predict whether a manufactured display panel module is faulty or not. In fact, it would be desirable to employ AI to predict defects in other hardware products, and not just display panel modules.

The above information disclosed in this Background section is only for enhancement of understanding of the background of the present disclosure, and therefore, it may contain information that does not form prior art.

SUMMARY

An embodiment of the present disclosure is directed to a method for classifying products manufactured via a manufacturing process. The method includes identifying a first data sample from a training dataset. The first data sample includes a first portion and a second portion. The method further includes generating a first mask based on the first data sample, where the first mask is associated with the first portion of the first data sample. A second data sample is generated based on a noise input. The first mask is applied to the second data sample for outputting a third portion of the second data sample. The third portion of the second data sample is combined with the second portion of the first data sample for generating a first combined data sample. Confidence and classification of the first combined data sample are predicted. The first combined data sample is added to the training dataset in response to predicting the confidence and the classification. The training dataset is invoked for training a classifier for classifying a manufactured product.

According to one embodiment, the first data sample is an image of a manufactured product depicting a plurality of layers, wherein the first portion is a first layer of the plurality of layers, and the second portion is a second layer of the plurality of layers.

According to one embodiment, an unsupervised machine learning model is invoked for predicting a layer of the plurality of layers to which each pixel of the image belongs.

According to one embodiment, the first mask identifies pixels in the first data sample associated with the first layer.

According to one embodiment, the second data sample is generated by a generator network, and the method further includes invoking a discriminator network for classifying the first combined data sample as an authentic sample.

According to one embodiment, the method further includes generating a second mask based on the first data sample, wherein the second mask is associated with the second portion of the first data sample; generating a third data sample based on a second noise input; applying the second mask to the third data sample for outputting a fourth portion of the third data sample; combining the fourth portion of the third data sample with the first portion of the first data sample for generating a second combined data sample; predicting confidence of the second combined data sample; and in response to the predicting, rejecting the third data sample.

According to one embodiment, the method further includes generating a second mask based on the first data sample, wherein the second mask is associated with the second portion of the first data sample; generating a third data sample based on a second noise input; applying the second mask to the third data sample for outputting a fourth portion of the third data sample; combining the fourth portion of the third data sample with the first portion of the first data sample for generating a second combined data sample; classifying the second combined data sample; and in response to the classifying, rejecting the third data sample.

According to one embodiment, the predicting the confidence is via a neural network that is trained using filtered training data.

According to one embodiment, the predicting the classification for the first combined data sample includes predicting whether the first combined data sample depicts a defect.

According to one embodiment, the method further includes adding a label to the first combined data sample based on the classification.

An embodiment of the present disclosure is directed to a system for classifying products manufactured via a manufacturing process. The system includes a processor and memory. The memory has stored therein instructions that, when executed by the processor, cause the processor to: identify a first data sample from a training dataset, the first data sample including a first portion and a second portion; generate a first mask based on the first data sample, wherein the first mask is associated with the first portion of the first data sample; generate a second data sample based on a noise input; apply the first mask to the second data sample for outputting a third portion of the second data sample; combine the third portion of the second data sample with the second portion of the first data sample for generating a first combined data sample; predict confidence of the first combined data sample; predict a classification for the first combined data sample; and add the first combined data sample to the training dataset in response to predicting the confidence and the classification, wherein the training dataset is invoked for training a classifier for classifying a manufactured product.

As a person of skill in the art should recognize, embodiments of the present disclosure allow augmentation of the training dataset with automatically generated data samples that provide high confident labels.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

DETAILED DESCRIPTION

Figure 1:
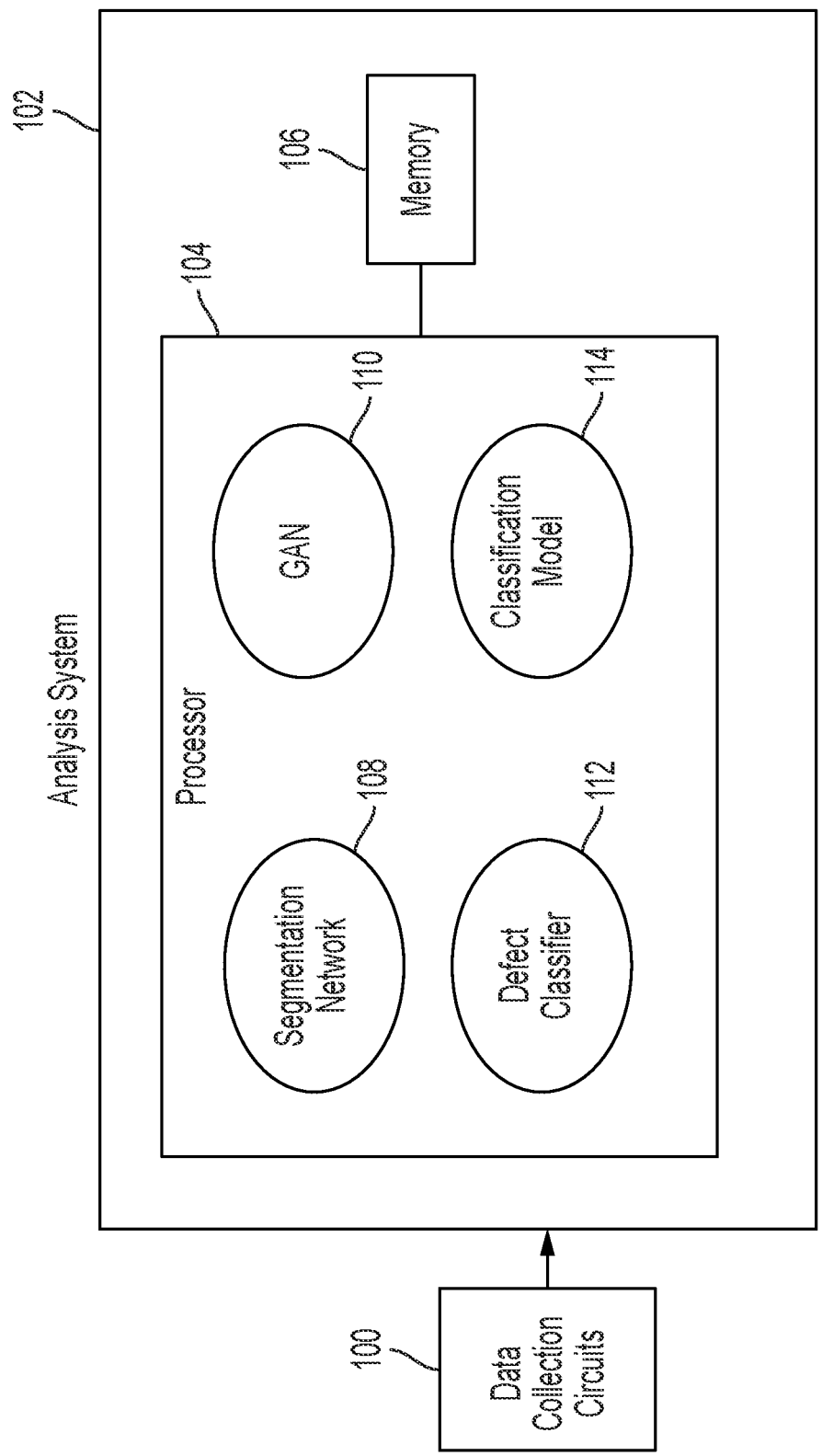
FIG. 1 is a block diagram of a system for augmenting a training dataset with automatically generated data samples according to one embodiment.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

As new types of display modules and product methods are deployed, and as product specifications tighten, it may be desirable to enhance equipment and quality-control methods to maintain production quality. For example, it may be desirable to monitor for manufacturing defects during production.

One way to monitor for manufacturing defects is by employing human inspectors that have the expertise to identify the defects. In this regard, high-resolution (sub-micron level) images may be acquired around defect areas. A human inspector may then review the acquired images to classify the defects into categories in accordance with the type of the defects and how the defects may affect the production yield. In more detail, the human inspector may sample a number of defect images and spend significant time searching for features to separate unclassified defect images into categories. Training the human inspectors, however, takes time. Even when trained, it may take weeks for a human inspector to identify manufacturing defects in a current batch of images, making it hard to expand the human inspector's work to multiple instances at a time.

Machine learning (ML) models may be used for quicker detection of manufacturing defects that may be expanded to multiple instances at a time. In order for such ML models to be useful, however, they should be accurate in their predictions. In addition, the models should be generalized so that accurate predictions may be made even on new data sets that have not been encountered previously.

Various factors, however, may degrade the performance of ML models. One such factor is insufficient samples in the training dataset used to train the models. The sparse training dataset (generally around 100 samples per class) relative to the high dimensionality of the data may lead to overfitting of the model. When the model is overfitted, erroneously labeled data may not be rejected, but learned by the model. This may lead to predictions being made during deployment based on the erroneously labeled data, causing the model to perform poorly on new, unseen data.

Thus, it is desirable to have additional training images to train the ML models. The creation of the training images, however, may be time-consuming and costly, generally requiring humans to manually examine and label the pixels of the training images. Mechanisms exist to augment a training dataset using a deep adversarial network. However, the deep adversarial network may rely on the existence of supervised images where the pixels are already labeled or annotated, in order to create additional realistic annotated images for augmenting the training dataset.

In general terms, embodiments of the present disclosure are directed to augmenting a training dataset with automatically generated data samples (e.g. image samples) that have high confidence labels. In this regard, an ML model generates masks for different layers/areas of an input image automatically, in an unsupervised manner. A deep generative model may generate a synthetic image for the input image (e.g. first data sample), and one or more layers of the synthetic image identified based on the generated masks. A particular layer of the synthetic image that is identified based on a particular mask may be combined with original layers of the input image to generate a new image (e.g. second data sample).

In one embodiment, the new image is added as new training data in response to determining confidence of the new image, and further in response to a correct classification of defects in the new image. A label (defective/not defective) may be assigned to the new image that is deemed to be confident and for which correct classifications have been made, and newly labeled image may be added to the training dataset for augmenting the training dataset.

FIG. 1 is a block diagram of a system for augmenting a training dataset with automatically generated data samples according to one embodiment. The system includes, without limitations, one or more data collection circuits 100, and an analysis system 102. The data collection circuits 100 may include, for example, one or more imaging systems configured to acquire image data of a product during a manufacturing process such as, for example, X-ray machines, Magnetic Resonance Imaging (MRI) machines, Transmission Electron Microscope (TEM) machines, Scanning Electron Microscope (SEM) machines, and/or the like. The image data generated by the data collection circuits 100 may be, for example, spectroscopy images such as Energy-Dispersive X-ray Spectroscopy (EDS) images and/or High-Angle Annular Dark-Field (HAADF) images, microscopy images such as Transmission Electron Microscopy (TEM) images, thermal images, and/or the like. The acquired data samples may not be limited to still images, but may also include video, text, Lidar data, radar data, image fusion data, temperature data, pressure data, and/or the like.

The data collection circuits 100 may be placed, for example, on top of a conveyer belt that carries the product during production. The data collection circuits 100 may be configured to acquire data samples (e.g. image data) of a product multiple times (e.g. every second or few seconds) over a period of manufacturing time.

The analysis system 102 may include one or more processors 104 and an associated memory 106, including, for example, application specific integrated circuits (ASICs), general purpose or special purpose central processing units (CPUs), digital signal processors (DSPs), graphics processing units (GPUs), and programmable logic devices such as field programmable gate arrays (FPGAs).

In one embodiment, the analysis system 102 is configured to address the problem of insufficient samples in the training dataset (e.g. 100 samples or less per class), by augmenting the training dataset with fake/synthetic training data that mimic the real/actual data in the training dataset. In this regard, the analysis system 102 may include a segmentation network 108, generative adversarial network (GAN) system 110, and a defect classifier 112.

In one embodiment, the segmentation network 108 is a deep neural network that is trained to generate one or more masks associated with one or more layers of an input image captured by the data collection circuits 100. In one embodiment, the segmentation network is an unsupervised deep neural network. In this regard, the segmentation network 108 may be configured to generate a segmentation mask in an unsupervised manner, without relying on annotations or labels to generate the masks. In one embodiment, the segmentation network 108 is configured to generate a plurality of masks for a plurality of layers or portions of the input image (e.g., of a display panel). Although the various embodiments are described in terms of layers of an input image, a person of skill in the art should recognize that the masks may be generated for any portion, area, or object of the input data, and is not limited to layers of an input image.

In one embodiment, the GAN system 110 is configured to generate a fake/synthetic data sample (e.g. fake/synthetic images) for each layer or portion of the input image. In this regard, the GAN system 110 may leverage adversarial training between a generator network of the GAN system, and a discriminator network of the GAN system. The generator network may be configured to generate the fake data samples that are aimed to fool the discriminator network to predict that the data samples are authentic, and the discriminator network may be configured to determine whether the generated data samples are authentic or fake. In one embodiment, a separate GAN model of the GAN system 110 is invoked to generate the synthetic image for a particular layer. The GAN model that is invoked may depend on the particular layer. In some embodiments, a single GAN model may be invoked to generate the synthetic images for all the layers of the input image. In one embodiment, the synthetic images generated by the GAN model are unlabeled.

In one embodiment, the defect classifier system (simply referred to as a defect classifier) 112 includes one or more deep neural networks that has been trained to determine confidence of the newly generated images. In one embodiment, confidence of the newly generated images is determined by an outlier filter that has been trained using confident learning as described in U.S. application Ser. No. 17/306,737, filed on May 3, 2021, the content of which is incorporated herein by reference. The outlier filter may be trained to classify a newly generated image as confident or not, as is described below with reference to FIG. 6. In some embodiments, the outlier filter is trained without a confident learning mechanism.

The defect classifier 112 may further include a defect detection model that is trained to classify and assign labels to the newly generated images, as is also described below with reference to FIG. 6. The classification made by the defect detection model may include classification/labeling of the image as defective/faulty or not defective/not faulty, along with the defect category and/or defect layer. In this regard, a layer that is part of the original image that contains a defect may trigger the labeling of the newly generated image as defective. In addition, a layer that contains the synthetic data may trigger the labeling of the newly generated image as defective. The newly generated images, along with their assigned labels (defective/not defective), may then be included in the training dataset. In this manner, the training dataset may be augmented with realistic image samples bearing high confidence labels.

In one embodiment, the analysis system 102 further includes a classification model 114 for classifying product manufacturing defects during deployment during an inference stage. In one embodiment, the classification model 114 is trained using the augmented training dataset generated via the above-described segmentation network 108, GAN system 110, and defect classifier 112.

In one embodiment, the data samples acquired by the data collection circuits 100 during an inference stage are provided to the classification model 114 for making a classification. The classification made by the classification model 114 may include classification of products as faulty or not faulty, classification of faulty products into defect categories, classification of defects into corresponding layers, and/or the like. In one embodiment, the analysis system 102 may generate a signal based on the classification outcome. For example, the signal may be for prompting action by a human inspector in response to classifying the product as a faulty product. The action may be to remove the product from the production line for purposes of re-inspection.

Figure 2:
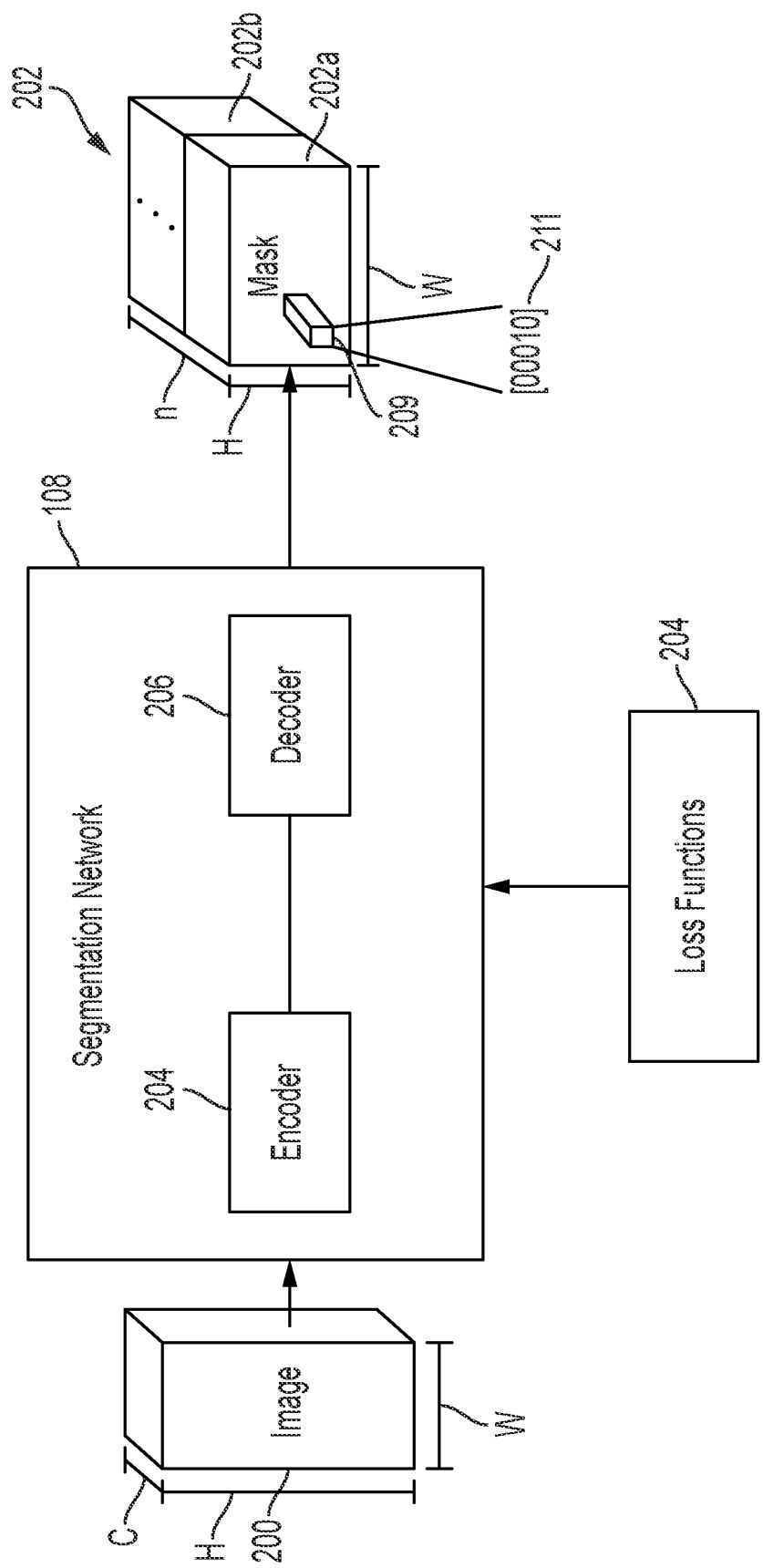
FIG. 2 is a conceptual block diagram of an unsupervised segmentation network according to one embodiment.

FIG. 2 is a conceptual block diagram of the segmentation network 108 according to one embodiment. In one embodiment, the segmentation network 108 takes an input image 200 and generates one or more segmentation masks 202a-202b (collectively referenced as 200) based on the features of the input image, in an unsupervised manner. In one embodiment, the image 200 is represented as a tensor having a height (H), width (W), and channels (e.g. red, green, and blue) as its dimension.

In one embodiment, the output of the segmentation network 108 is also represented as a tensor 202 having a height (H), width (W), and number of image layers/portions (N) as its dimension. The tensor 202 may be referred to as a mask tensor M. The number of layers of the mask tensor may correspond to the number of layers of the input image 200. In one embodiment, each slice 202a-202b of the mask tensor 202 along the N dimension corresponds to the mask of that layer. In one embodiment, each pixel of the mask of height and weight dimensions ($M_{i,j}$) 209 may be represented as a vector 211 having values of "1" or "0" that identifies a layer to which the pixel belongs. A value of "1" may indicate that the pixel is associated with the corresponding layer, and a value of "0" may indicate that the pixel is not associated with the corresponding layer. In one embodiment, a pixel belongs to only one image layer. Thus, the vector 211 for pixel $M_{i,j}$ has at most one element with a value of "1." In the example of FIG. 2, tensor 211 has a value of "1" as the 4th element, indicating that the pixel belongs to layer 4 of the input image.

In one embodiment, the segmentation network 108 includes an encoder 204 and a decoder 206. The encoder 204 may be a convolutional neural network configured to extract features of the input image 200. The extracted features may be ones that help differentiate the various layers of the input image. The decoder 206 may be another neural network configured to generate predictions of the pixels in the image based on the extracted features. The predictions may be, for example, identification of a layer to which the pixels belong. In one embodiment, the segmentation network 108 is implemented as a pyramid scene parsing network (PSPNet). Other semantic segmentation networks may also be employed for generating the masks in an unsupervised manner, such as, for example, U-Net, SegNet, Deeplab, and/or the like.

In one embodiment, the segmentation network 108 is trained based on one or more loss functions 204 to identify the different layers of an input image and generate appropriate masks. In one embodiment, the segmentation network 108 is trained to generate a predefined number of masks that may be depend on a number of layers (N) in the input image 200. In this regard, the segmentation network 108 may be trained to generate a separate segmentation mask for each identified layer of the input image 200. As discussed above, each segmentation mask may identify a pixel that belongs to the layer that is represents.

In one embodiment, prior to an initial deployment of the segmentation network, the segmentation network is pre-trained using one or more of the loss functions 204 including, for example, a similarity loss function (e.g. loss relating to similarity between the pixels of an input image), a special continuity loss function (e.g. loss relating to value changes between the pixels of the input image), an opening loss function, and/or normalized cut (N-cut) loss function. In computing the similarity loss, the pixels in an image are mapped to corresponding clusters, and an error is computed based on the mapping. In this regard, pixels that are similar to each other are expected to be mapped to the same cluster, whereas pixels that are different from each other are expected to be mapped to different clusters. In regards to the spatial continuity loss, the clusters of the image pixels are aimed to be spatially continuous. The cluster labels may thus be optimized to be the same as those of the neighboring pixels.

In regards to the opening loss, an error is computed to provide a sharper boundary of objects in one cluster by performing a grayscale closing of images with dilation and erosion. In regards to N-cut loss, a normalized cut criterion measures both a total dissimilarity between different groups of pixels as well as a total similarity between the groups of pixels.

As the segmentation network 108 is used to generate masks and augment the training dataset, the network may further be refined/trained based on feedback from the GAN system 110 and/or defect classifier 112. For example, the segmentation network 108 may be trained to create more accurate segmentations of the various layers of the input image and/or better masks, based on losses computed from an inability to fool the discriminator network of the GAN system 110, and/or based on low confidence scores and/or erroneous label predictions by the defect classifier 112.

Figure 3:
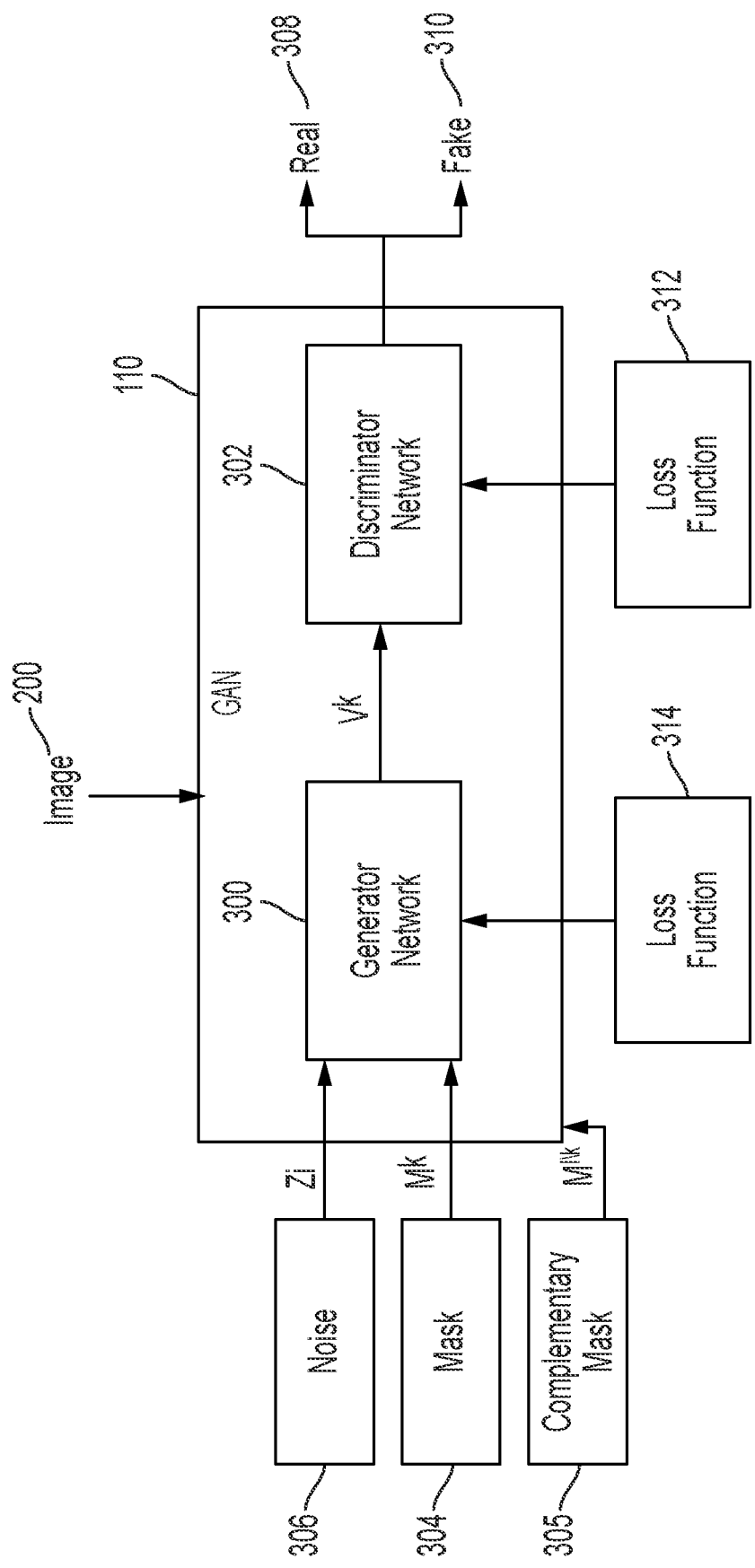
FIG. 3 is a conceptual block diagram of a generative adversarial network system according to one embodiment.

FIG. 3 is a conceptual block diagram of the GAN system 110 according to one embodiment. In one embodiment, the GAN system includes a generator network 300 and a discriminator network 302. Both the generator network 300 and the discriminator network 302 may be implemented as neural networks.

In one embodiment, an objective of the generator network 300 is to generate a synthetic image that is so close to a probability distribution of the data in the training dataset that it can potentially fool the discriminator into determining that the synthetic image is real/authentic data that is part of the original training dataset. In this regard, the generator network 300 employs a machine learning model (GAN model) to generate the synthetic image. In one embodiment, a kth GAN model is selected for generating the synthetic image for a kth layer of the input image 200. Thus, in one embodiment, there are a total of N GAN models for N layers of the input image 200. In some embodiments, a single GAN model is used to generate synthetic images for all layers of the input image.

In generating a kth synthetic image, the GAN model receives a kth noise vector ($Z_k$) 306 and transforms the noise vector into an unlabeled image that attempts to mimic the data distribution of data observed in the training dataset. The noise vector may be a random vector that may be sampled from a prior distribution p(z). The prior distribution may be, for example a normal distribution.

Once generated, the synthetic image is masked with a kth mask ($M^k$) 304 (the kth slice of the mask tensor 202 in FIG. 2), and the input image 200 is masked with a complementary mask 305 ($M^{I/k}$). A kth layer of the synthetic image may be obtained by masking the synthetic image with the kth mask 304. Layers other than the kth layer of the original input image may be obtained by making the original image with the complementary mask 305. In this regard, the complementary mask 305 identifies the pixels that do not belong to the kth layer (e.g. all pixels with the value of "0" in $M^k$). The identified pixels may be assigned a value of "1" in the complementary mask 305, and applied to the original input image 200 to obtain the layers of the input image 200 other than the kth layer.

In one embodiment, the kth layer of the synthetic image and the layers of the input image 200 other than the kth layer are combined (e.g. pixel by pixel addition of pixels in the kth layer of the synthetic image, and pixels in the layers of the input image other than the kth layer) to form a synthesized training image ($V^k$) as follows:

$$V^k \leftarrow M^k G_k(M^k, Z_k) \oplus M^{I/k} I \text{ for } k \in \{1, \ldots, n\}$$

where $G_k$ is a generator function for a kth layer that takes in the kth mask ($M^k$) 304 and the noise vector $Z_k$ 306.

The generated synthetic training image may be provided to the discriminator network 302 for classifying the generated training image. An object of the discriminator network 302 may be to classify image samples correctly. For example, an object of the discriminator network 302 may be to identify the original training data as real, and identify the synthetic training data as fake. In this regard, artificial neurons in the layers of the discriminator network 302 may examine characteristics of the pixels in the synthetic training data to determine whether the synthetic training data is real 308 or fake 310. If the discriminator determines that the synthetic training data is real, then the generator network 300 has successfully tricked the discriminator network 302. A loss function 312 computed from the discriminator's failure to correctly identify the synthetic training data as fake 310 may then be computed for further training the discriminator network 302.

If, however, the discriminator network 302 is not tricked, the discriminator network 302 may transmit a signal to the generator network 300. The signal may include, for example, a cross-entropy loss for not having been tricked by the generator network 300. In response to the transmitted signal, the generator network 300 may change how it generates synthetic training data based on a loss function 314 resulting from its failure to fool the discriminator network. For example, the generator network 300 may modify one or more pixel distributions, update one or more functions or weights applied by artificial neurons of the neural network, and/or the like. The GAN system 110 may be deemed to be trained when the generator network 300 has learned to generate image samples that can fool the discriminator network 302.

Figure 4:
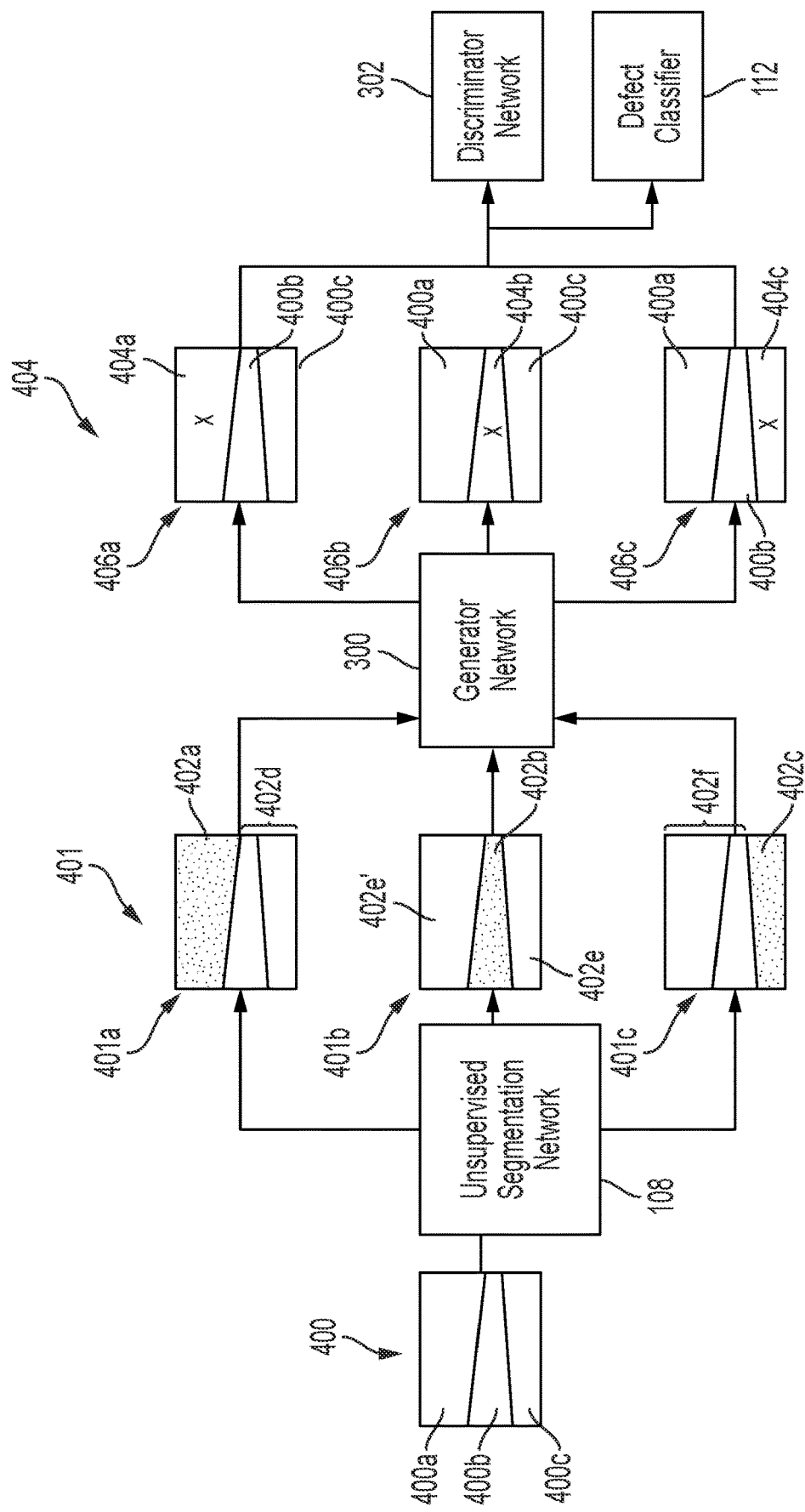
FIG. 4 is a conceptual block diagram of a process for augmenting a training dataset with automatically generated data samples according to one embodiment.

FIG. 4 is a conceptual block diagram of a process for augmenting a training dataset with automatically generated data samples according to one embodiment. An original training image 400 is provided to the segmentation network 108 as input for generating a plurality of segmentation masks. In an example where training data is generated for detecting defects of display panels, the input image 400 may depict a plurality of layers 400a-400c of a display panel used as training data. In one embodiment, the training image that depicts the various layers may be a TEM image captured by a TEM machine.

In one embodiment, the segmentation network 108 is configured to parse the input image 400, and generate a mask tensor 401 (similar to mask tensor 202), where each slice of the mask tensor corresponds to a mask 401a-401c associated with a particular image layer 400a-400c. In one embodiment, the segmentation network 108 may be configured to generate a preset number of masks. The mask may be, for example, a binary mask. For example, pixels 402a of a first mask 401a corresponding to a first layer 400a of the input image 400 may be assigned a value of 1, and remaining other pixels 402d corresponding to remaining other layers 400b, 400c of the input image 400 may be given a value of 0. Similarly, pixels 402b of a second mask 401b corresponding to a second layer 400b of the input image 400 may be assigned a value of 1, and remaining other pixels 402e, 402e' corresponding to remaining other layers 400a, 400c of the input image 400 may be assigned a value of 0. Furthermore, pixels 402c of a third mask 401c corresponding to a third layer 400c of the input image 400 may be assigned a value of 1, and remaining other pixels 402f corresponding to remaining other layers 400a, 400b of the input image 400 may be assigned a value of 0.

In one embodiment, the generated masks 401a-401c are provided to the generator network 300 for generating one or more synthetic images. In one embodiment, the synthetic images are generated serially or in parallel. In this regard, the generator network 300 may take as an input a kth mask 401a-401c for a kth layer 400a-400c, and select a kth machine learning model to generate a kth synthetic image based on a kth noise vector. The machine learning model that is invoked may vary (or not) depending on the layer associated with the mask 401a-401c. The kth synthetic image may be an unlabeled image.

Once the kth synthetic image has been generated, the kth mask 401a-401c may be applied to the synthetic image for extracting the pixels in the kth layer 404a-404c of the synthetic image.

In one embodiment, the synthetic data in the kth layer 404a-404c of the synthetic image is combined with pixels in the layers of the original image 400 that are not associated with the kth layer, to form a kth new synthetic training image 406a-406c. In one embodiment, a kth complementary mask may be generated based on the kth mask to extract the pixels in the layers of the original image 400 that are not associated with the kth layer. In this regard, a bitwise AND operation may be performed between the kth complementary mask and the pixels of the original image 400.

In one embodiment, the synthetic training images 406a-406c are provided to the discriminator network 302 for classification. If a particular synthetic training image is correctly classified by the discriminator network 308 as being fake, a signal is transmitted to the generator network 300. The signal may prompt the generator network 300 to alter, for example, an aspect of the network 300 based on a corresponding loss function, so that future synthetic images generated by the network 300 may better fool the discriminator network 308. A signal may also be transmitted to the segmentation network 108 for prompting the segmentation network to alter, for example, an aspect of the network for generating masks, based on the loss function.

In one embodiment, synthetic training images 406a-406c are further evaluated by the defect classifier 112 for predicting defects in the synthetic training images. In one embodiment, the defect classifier 112 includes a first neural network trained to predict the confidence of the synthetic training images. The first neural network may be an outlier filter that attempts to classify the synthetic training images into a known classification class (if the filter has been trained using unsupervised learning), or identifies features/parameters of the synthetic training images that indicate confidence or lack of confidence of the images (if the filter has been trained using supervised learning). The outlier filter may output an indication of confident or not confident (e.g. via confidence scores that satisfy a threshold or not) based on its ability to confidently cluster the synthetic training images, or identification of the features/parameters of the synthetic training images.

In one embodiment, the defect classifier 112 further includes a defect detection model for identifying defects on the synthetic training images 406a-406c. In this regard, the defect detection model may predict a label for each layer of a particular synthetic training image as defective or not defective. In one embodiment, the defect classifier 112 compares the predicted labels against the assigned labels, and determines whether the predicted labels align with the assigned labels. The assigned labels may be labels indicating the layers of the original image containing defects. The assigned labels may also be a label identifying a layer of a particular synthetic training image that contains synthetic data. In one embodiment, a prediction of defect for a layer labeled as containing synthetic data is deemed to be a correct prediction.

In one embodiment, if the predicted labels for a particular synthetic training image do not align/match with the assigned labels, or if the particular synthetic training image is deemed to be unconfident, the particular synthetic training image is rejected and not added to the training dataset. One or more loss computations may then be performed for updating the segmentation network 108 and/or generator network 300 based on the loss computations.

In one embodiment, if the predicted labels for the particular synthetic training image align/match with the assigned labels, and, if the particular synthetic training image is deemed to be confident, the particular synthetic training image is added to the training dataset along with the predicted labels.

Figure 5:
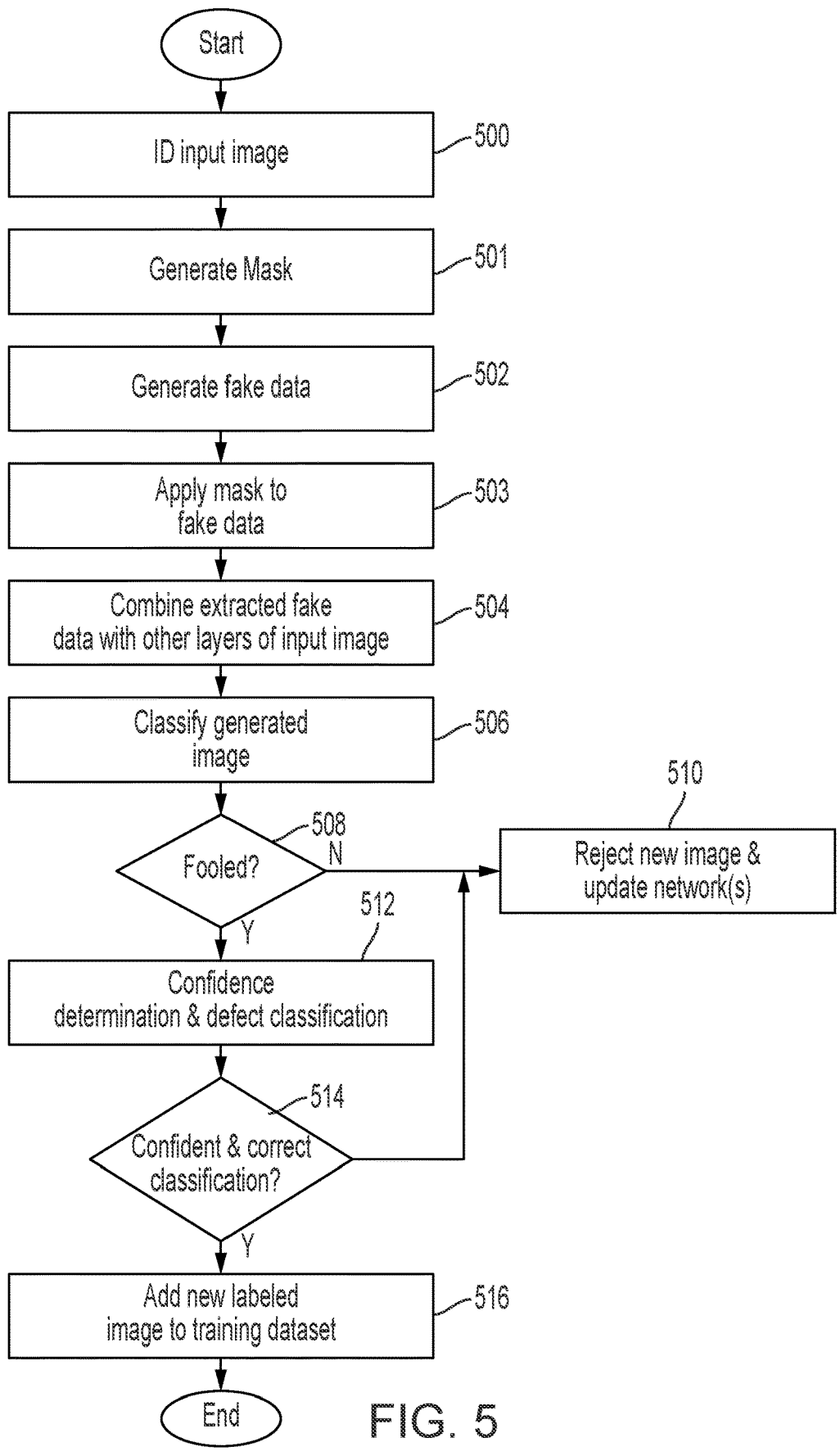
FIG. 5 is a flow diagram of a process for augmenting a training dataset with automatically generated data samples according to one embodiment.

FIG. 5 is a flow diagram of a process for augmenting a training dataset with automatically generated data samples according to one embodiment. It should be understood that the sequence of steps of the process is not fixed, but can be modified, changed in order, performed differently, performed sequentially, concurrently, or simultaneously, or altered into any desired sequence, as recognized by a person of skill in the art.

The process starts, and at block 500, the segmentation network 108 identifies a first image (e.g. first data sample) from a training dataset. The first image may include one or more layers (e.g. a first portion and a second portion). In some examples, each layer corresponds to a material layer of a product, such as a display panel. In one embodiment, the segmentation network 108 invokes an unsupervised machine learning model for predicting a layer to which each pixel of the first image belongs.

At block 501, the segmentation network 108 generates a mask based on the first image, including, for example, a prediction of layers to which the pixels belong. The mask may be associated, for example, with a layer (e.g. first portion) of the first image. In some examples, a separate mask may be generated for each of the layers of the first image, and the process may repeat for each of the generated masks (e.g. serially or in parallel). The mask may be a binary mask with a value of 1 for a pixel of the first input image if the pixel belongs to the layer represented by the mask, and a value of 0 if the pixel belongs to a different layer.

At block 502, a first neural network of the generator network 300 generates synthetic/fake data (e.g. second data sample) based on a noise input (e.g. noise vector) sampled from a prior distribution of observed data.

At block 503, the generator network 300 applies the mask to the generated synthetic data for outputting a portion of the synthetic data (e.g. third portion of the second data sample) that corresponds to a layer of the first input image represented by the mask.

At block 504, the portion of the synthetic data that is extracted via the mask is combined with portions of the first input image corresponding to the other layers (e.g. second portion of the first data sample) to generate a combined data sample (also referred to as a synthesized training image). In this regard, the portions of the first input image corresponding to the other layers may be extracted via a complementary mask that may be generated based on the mask. A pixel in the complementary mask may be assigned a value of "1" if a corresponding pixel in the mask has a value of "0," and assigned a value of "0" if a corresponding pixel in the mask has a value of "1." The complementary mask may then be applied to the first input image (e.g. a bitwise AND operation with the pixels in the first input image) to extract the pixels corresponding to the layers of the first input image other than the layer represented by the mask. A pixel by pixel addition may be performed for the pixels of the synthetic data that is extracted via the mask, and the pixels in the portions of the first input image corresponding to the other layers.

At block 506, the synthesized training image is provided to the discriminator network 302 for classification. For example, the discriminator network 302 may correctly classify the synthesized training image as fake, or incorrectly classify the synthesized training image as authentic/real.

At block 508, a determination is made as to whether the generator network 300 has successfully fooled the discriminator network 302 into classifying the synthesized training image as authentic/real. If the answer is NO, the synthesized training image is rejected, at block 510, and a signal is transmitted to the segmentation network 108 and/or generator network 300 for updating the networks. In one embodiment, the signal may be an error/loss computation based on the inability to fool the discriminator.

If, however, the generator network 300 is able to successfully fool the discriminator network 302, the defect classifier 112 is invoked, at block 512, for determining confidence of the synthesized training image, and for classifying the synthesized training image as defective or not defective, as is described in further detail below with respect to FIG. 6.

In regards to defect classification by the defect classifier 112, the defect classifier may be configured to predict, for each layer of the synthesized training image, whether the layer contains a defect or not. In one embodiment, a comparison is made between the label (defective or not) predicted by the defect classifier 112, and the true labels assigned to the original image, for determining whether the labels align. The defect classifier 112 may be deemed to have made an accurate prediction when the labels align. The defect classifier 112 may further be deemed to have made an accurate prediction when a layer in the synthetic training image that contains the synthetic data is classified as being defective.

If, at block 514, the synthesized training image is predicted to be confident, and further, the predicted classification is deemed to be accurate, the defect classifier 112 adds, at block 516, the synthetized training image to the training dataset. In doing so the synthetized training image may be assigned a label (e.g. defective or not defective) based on the predicted classification.

If, however, the answer is NO, the synthesized training image is rejected, at block 510, and a signal is transmitted to the segmentation network 108 and/or generator network 300 for updating the networks based on a loss function that results from the lack of confidence and/or defect prediction error.

Figure 6:
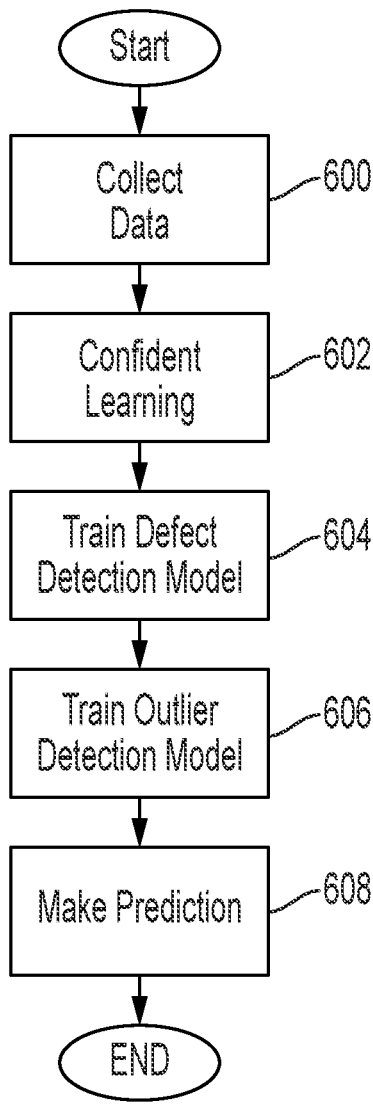
FIG. 6 is a flow diagram of a process for training and using a defect classifier 112 according to one embodiment.

FIG. 6 is a more detailed flow diagram of training and using the defect classifier 112 according to one embodiment. It should be understood that the sequence of steps of the process is not fixed, but can be altered into any desired sequence as recognized by a person of skill in the art.

The process starts, and at 600, data of products manufactured during the manufacturing process is captured by one or more of the data collection circuits 100. The captured data may be, for example, image data.

The data captured by the data collection circuits 100 may be used for training the ML models of the defect classifier 112 such as, for example, the outlier filer and defect detection model. In this regard, images around defect areas of a product that are acquired by the data collection circuits 100 may be reviewed and labeled by a human inspector for identifying the defect. Humans, however, are prone to errors, and the labels attached to the images may be erroneous at times. Labeling errors may be a problem as the accuracy of the models depend on the accuracy of the training data.

In one embodiment, confident learning is invoked at block 602 for identifying and removing the noisy data samples in the training dataset. The noisy data samples may include image data that are predicted to be mis-labeled by the human inspector. In one embodiment, confident learning is based on an estimation of a joint distribution between noisy (given) labels, and uncorrupted (true) labels, as described in further detail in Northcutt et. al, "Confident Learning: Estimating Uncertainty in Dataset Labels," (2021) available at arxiv.org/abs/1911.00068v4, the content of which is incorporated herein by reference.

In one embodiment, in response to the confident learning at block 602, data samples are identified in the training dataset that are predicted to be noisy, and labels are applied to the identified data samples as noisy. The noisy data samples are removed from the training dataset.

At block 604, the defect detection model is trained based on the clean data samples in the filtered training dataset. The trained defect detection model may be, for example, a joint fusion model as described in U.S. patent application Ser. No. 16/938,812 filed on Jul. 24, 2020, entitled "Image-Based Defects Identification and Semi-Supervised Localization," or U.S. patent application Ser. No. 16/938,857, filed on Jul. 24, 2020, entitled "Fusion Model Training Using Distance Metrics," the content of both of which are incorporated herein by reference. In some embodiments, the defect detection model is single machine learning model (instead of a joint fusion model) configured with a machine learning algorithm such as, for example, random forest, extreme gradient boosting (XGBoost), support-vector machine (SVM), deep neural network (DNN), and/or the like.

At block 606, the noisy and/or clean data samples from the confident learning block 602 are used for training the outlier filter. One of supervised or unsupervised learning may be used to train the outlier filter. In the embodiment where supervised learning is used, clean and noisy data samples that have been labeled as such may be used to teach the outlier filter to classify data as noisy/unconfident or clean/confident. A decision boundary may be identified during the training for determining the boundary that separates the noisy data from the clean data. A machine learning algorithm such as, for example, logistic regression, may be used for identifying the decision boundary.

In the embodiment where unsupervised learning is used, a clustering algorithm may be invoked for finding similarities in the training data samples, and similar data samples may be grouped into a cluster. A clustering algorithm such as a K-Means clustering algorithm may be used for generating the clusters.

In one embodiment, the boundaries of the clusters, or the placement of the decision boundary, may be tuned based on a tuning threshold hyperparameter. The tuning threshold may control how close the decision boundary or cluster is to the noisy data without being filtered out. The closer the boundary to the noisy data, the greater the coverage of the data samples that are kept for purposes of defect prediction. However, accuracy of the prediction may decrease as coverage decreases. In one embodiment, a desired coverage and/or accuracy are entered as inputs, and an appropriate tuning threshold may be selected as a function of the entered inputs.

At block 608, the trained outlier filter and the trained defect detection model of the defect classifier 112 are used for making predictions relating to the synthesized training data generated by the GAN system 110. In one embodiment, the outlier filter is invoked to predict the confidence of the synthesized training data. In this regard, the outlier filter identifies the data samples that cannot be confidently clustered into one of the known classification classes (if the filter has been trained using unsupervised learning), and/or have features/parameters that cause the data to be classified as noisy/unconfident (if the filter has been trained using supervised learning). In one embodiment, the defect detection model is invoked for classifying and assigning labels to the new synthetic images. The labels may identify, for example, a type and/or location (e.g. layer) of the defect, and/or identify a layer that has been synthesized.

It should be appreciated that although confident learning is used as a mechanism to train the outlier filter and the defect detection model, either or both of the filter and model may be trained without confident learning.

In some embodiments, the systems and methods for augmenting a training dataset with automatically generated data samples, including the segmentation network 108, GAN system 110, defect classifier 112, and classification model 114 as discussed above, are implemented in one or more processors. The term processor may refer to one or more processors and/or one or more processing cores. The one or more processors may be hosted in a single device or distributed over multiple devices (e.g. over a cloud system). A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium. A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Although exemplary embodiments of systems and methods for augmenting a training dataset with automatically generated data samples have been specifically described and illustrated herein, many modifications and variations will be apparent to those skilled in the art. Accordingly, it is to be understood that a system and method for of for augmenting a training dataset with automatically generated data samples constructed according to principles of this disclosure may be embodied other than as specifically described herein. The disclosure is also defined in the following claims, and equivalents thereof.

What is claimed is:

1. A computer-implemented method for classifying products manufactured via a manufacturing process, the method comprising:
   identifying a first set of pixels associated with a first portion of a first image and a second set of pixels associated with a second portion of the first image;
   generating, via a first unsupervised deep neural network, a first mask based on the first image, wherein the first mask is associated with the first portion of the first image, wherein the generating of the first mask includes identifying a third set of pixels of the first mask that correspond to the first set of pixels of the first image;
   generating, via one or more generator neural networks for a generative adversarial network (GAN), a second image based on a noise input, wherein the second image is unlabeled;
   applying the first mask to the second image for outputting a fourth set of pixels of the second image;
   combining the fourth set of pixels of the second image with the second set of pixels that correspond to the second portion of the first image for generating a first combined image;
   predicting, via a filter neural network of a defect classification system, confidence of the first combined image;
   determining that the confidence satisfies a threshold confidence;
   predicting, via a defect detection neural network of the defect classification system, a classification for the first combined image;
   determining that the classification predicted for the first combined image equals an assigned classification;
   adding a label to the first combined image based on the classification predicted for the first combined image;
   adding the first combined image with the added label to a training dataset in response to determining that the confidence satisfies the threshold confidence, and based on determining that the classification predicted for the first combined image equals the assigned classification, training a classification neural network based on the training dataset;
   applying the classification neural network on newly obtained images to detect a defect in a manufactured product; and
   controlling a portion of a product manufacturing process based on detecting the defect.

2. The method of claim 1, wherein the first image is an image of a second manufactured product depicting a plurality of layers, wherein the first portion is a first layer of the plurality of layers, and the second portion is a second layer of the plurality of layers.

3. The method of claim 2 further comprising:
   invoking the first unsupervised deep neural network for predicting a layer of the plurality of layers to which each pixel of the first image belongs.

4. The method of claim 2, wherein the first mask identifies the first set of pixels in the first image associated with the first layer.

5. The method of claim 1, wherein the second image is generated by the one or more generator neural networks, the method further comprising:
   invoking a discriminator network for classifying the first combined image as an authentic sample.

6. The method of claim 1 further comprising:
   generating a second mask based on the first image, wherein the second mask is associated with the second portion of the first image;
   generating a third image based on a second noise input;
   applying the second mask to the third image for outputting a fourth portion of the third image;
   combining the fourth portion of the third image with the first portion of the first image for generating a second combined image;
   predicting confidence of the second combined image; and
   in response to the predicting, rejecting the third image.

7. The method of claim 1 further comprising:
   generating a second mask based on the first image, wherein the second mask is associated with the second portion of the first image;
   generating a third image based on a second noise input;
   applying the second mask to the third image for outputting a fourth portion of the third image;
   combining the fourth portion of the third image with the first portion of the first image for generating a second combined image;
   classifying the second combined image; and
   in response to the classifying, rejecting the third image.

8. The method of claim 1, wherein the filter neural network is trained using filtered training data.

9. The method of claim 1, wherein the predicting the classification for the first combined image includes predicting whether the first combined image depicts a defect.

10. A system for classifying products manufactured via a manufacturing process, the system comprising:
    processor; and
    memory, wherein the memory has stored therein instructions that, when executed by the processor, cause the processor to:
       identify a first set of pixels associated with a first portion of a first image and a second set of pixels associated with a second portion of the first image;
       generate, via a first unsupervised deep neural network, a first mask based on the first image, wherein the first mask is associated with the first portion of the first image, wherein the generating of the first mask includes identifying a third set of pixels of the first mask that correspond to the first set of pixels of the first image;
       generate, via one or more generator neural networks for a generative adversarial network (GAN), a second image based on a noise input, wherein the second image is unlabeled;
       apply the first mask to the second image for outputting a fourth set of pixels of the second image;
       combine the fourth set of pixels of the second image with the second set of pixels that correspond to the second portion of the first image for generating a first combined image;
       predict, via a filter neural network of a defect classification system, confidence of the first combined image;
       determine that the confidence satisfies a threshold confidence;

predict, via a defect detection neural network of the defect classification system, a classification for the first combined image;

determine that the classification predicted for the first combined image equals an assigned classification;

add a label to the first combined image based on the classification predicted for the first combined image; and add the first combined image with the added label to a training dataset in response to instructions that cause the processor to determine that the confidence satisfies the threshold confidence, and based on instructions that cause the processor to determine that the classification predicted for the first combined image equals the assigned classification, train a classification neural network based on the training dataset;

apply the classification neural network to detect a defect in a manufactured product; and control a portion of a product manufacturing process based on detecting the defect.

11. The system of claim 10, wherein the first image is an image of a second manufactured product depicting a plurality of layers, wherein the first portion is a first layer of the plurality of layers, and the second portion is a second layer of the plurality of layers.

12. The system of claim 11, wherein the instructions further cause the processor to:

invoke the first unsupervised deep neural network for predicting a layer of the plurality of layers to which each pixel of the first image belongs.

13. The system of claim 11, wherein the first mask identifies the first set of pixels in the first image associated with the first layer.

14. The system of claim 10, wherein the second image is generated by the one or more generator neural networks, wherein the instructions further cause the processor to:

invoke a discriminator network for classifying the first combined image as an authentic sample.

15. The system of claim 10, wherein the instructions further cause the processor to:

generate a second mask based on the first image, wherein the second mask is associated with the second portion of the first image;

generate a third image based on a second noise input;

apply the second mask to the third image for outputting a fourth portion of the third image;

combine the fourth portion of the third image with the first portion of the first image for generating a second combined image;

predict confidence of the second combined image; and in response to predicting, reject the third image.

16. The system of claim 10, wherein the instructions further cause the processor to:

generate a second mask based on the first image, wherein the second mask is associated with the second portion of the first image;

generate a third image based on a second noise input;

apply the second mask to the third image for outputting a fourth portion of the third image;

combine the fourth portion of the third image with the first portion of the first image for generating a second combined image;

classify the second combined image; and in response to classifying, reject the third image.

17. The system of claim 10, wherein the filter neural network is trained using filtered training data.

18. The system of claim 10, wherein the instructions that cause the processor to predict the classification for the first combined image include instructions that cause the processor to predict whether the first combined image depicts a defect.

* * * * *